No. 717,391. Patented Dec. 30, 1902.
W. W. GROCOTT.
METALLIC LINING FOR COFFINS.
(Application filed Apr. 28, 1902.)
(No Model.)
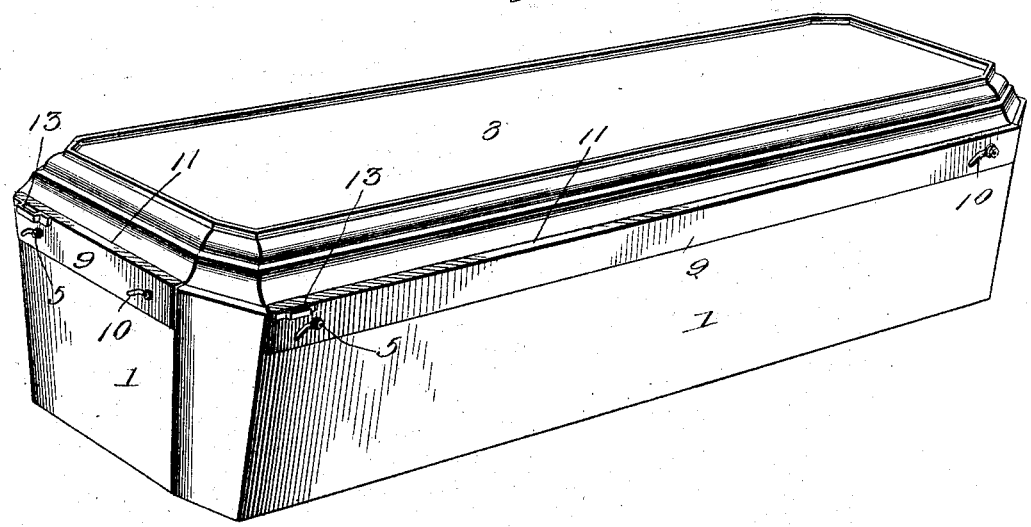
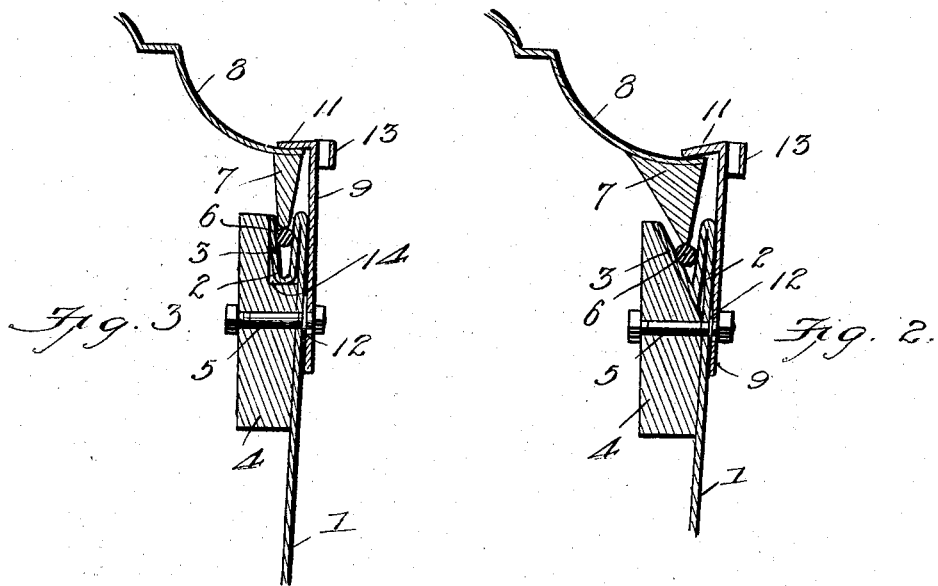
Witnesses
Jno. J. Koerth.
Chas. S. Hyer.
Inventor
Willis W. Grocott,
By Victor J. Evans
Attorney

United States Patent Office.

WILLIS W. GROCOTT, OF ST. LOUIS, MISSOURI.

METALLIC LINING FOR COFFINS.

SPECIFICATION forming part of Letters Patent No. 717,391, dated December 30, 1902.

Application filed April 28, 1902. Serial No. 105,090. (No model.)

*To all whom it may concern:*

Be it known that I, WILLIS W. GROCOTT, a citizen of the United States, residing at St. Louis, in the State of Missouri, have invented new and useful Improvements in Metallic Linings for Coffins, of which the following is a specification.

My invention relates to new and useful improvements in coffins, and more especially to metallic linings therefor; and its object is to provide means of novel construction whereby the cover may be securely fastened to the lining and the whole effectually sealed.

With the above and other objects in view the invention consists in providing the upper edge of the lining of the body of the coffin with an inner V-shaped flange supported upon reinforcing-strips extending around the inner wall of the lining. This flange contains a strip of flexible material, as rubber, which is adapted to be contacted by a tapered flange formed along the bottom of the edges of the top lining. Angular plates are fitted on the outer surfaces of the sides and extend over the edges of the top lining. These plates are so mounted that when they are slid longitudinally the lining of the top is pressed downward, forcing the flanges thereof into the rubber strip, and thereby thoroughly sealing the coffin.

The invention has been fully illustrated in the accompanying drawings, in which—

Figure 1 is a perspective view of the lining embodying my invention. Fig. 2 is a section through a portion thereof, showing the sealing means; and Fig. 3 is a similar view of a modified form of sealing means.

Referring to the drawings by numerals of reference, 1 is the sheet-metal body of the coffin-lining, and the upper edges thereof are provided on the inner sides with V-shaped flanges 2, formed by bending said edges upon themselves. The inner surfaces 3 of the flanges rest upon inclined faces of reinforcing-strips 4, secured to the walls 1 by means of preferably two bolts 5.

A strip 6 of rubber or other suitable material is fitted to the flanges 2 and is adapted to be contacted by a flange or bead 7, formed upon the under surface of the edge of a metallic top lining 8. This flange is so shaped as to readily project into the V-shaped flange 2.

A plate 9, having curved slots 10 therein, is fitted on each side of the lining 1 and is provided at its upper edge with a right-angle flange 11, extending over the edge of the top lining 8. Each slot 10 is adapted to receive one of the bolts 5, and a washer 12 is arranged on each bolt and between the parts 1 and 9 and prevents the admission or escape of air or water through the bolt-hole.

A bracket 13 is formed on each plate 9 adjacent to one of the slots 10 and is adapted to receive a rod or other suitable tool and serve as a fulcrum when said tool is swung against the head of the adjacent bolt 5. As the bolt is immovable, this action will slide the plate 9, to which the bracket is secured, longitudinally, and as the bolts engage curved slots 10 said plate will be forced downward, drawing the top lining 8 therewith and forcing its flanges 7 against the sealing-strip. After the plate 9 on each side of the lining 1 has been shifted in this manner the lining is rendered absolutely air-tight.

If desired, an angular shoulder 14 may be formed in each strip 4, as shown in Fig. 3. This shoulder will serve to support the flange 2, as in the other construction.

In the foregoing description I have shown the preferred form of my invention; but I do not desire to be limited thereto, as I am aware that modifications may be made therein without departing from the spirit or sacrificing any of the advantages thereof, and I therefore reserve the right to make such changes as fairly fall within the scope of my invention.

Having thus fully described the invention, what is claimed as new is—

1. A lining, comprising a body portion, a top lining, longitudinally-movable plates adjustably secured to the body, flanges thereto engaging the top lining, and means whereby the plates are guided downward during their longitudinal movement.

2. A lining comprising a body portion, a top lining, a longitudinally-movable plate secured to the body, a flange thereto overlapping the edge of the top lining, and guide-bolts extending from the body and engaging curved slots in the plate whereby the plate is guided downward during its longitudinal movement.

3. A lining comprising a body portion, a top lining, longitudinally-movable plates secured to the body portion and having curved edge slots, stationary bolts extending from the body and through the slots, whereby the plates are guided downward during their longitudinal movement, and brackets on the plates for the reception of a bolt-engaging tool.

4. A lining comprising a body portion, a V-shaped flange along its inner edge, a packing in the flange, a reinforcing-strip having an outer and upper cut-away portion with which said flange engages, and a top lining having a depending flange adapted to extend into the V-shaped flange and compress the packing.

In testimony whereof I affix my signature in presence of two witnesses.

WILLIS W. GROCOTT.

Witnesses:
LOUIS C. SCHELL,
GEO. F. BERGFELD.